Patented Oct. 10, 1950

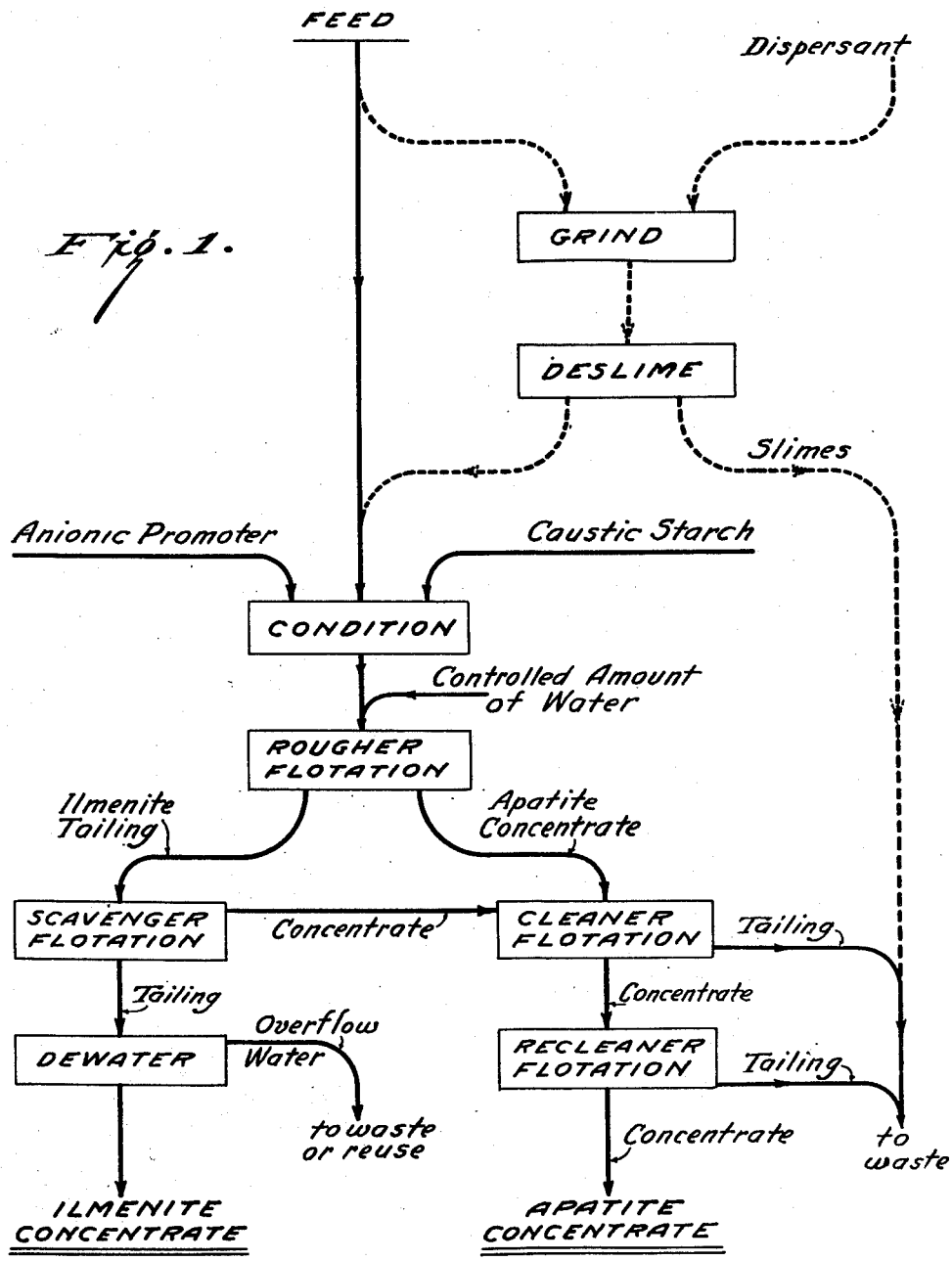

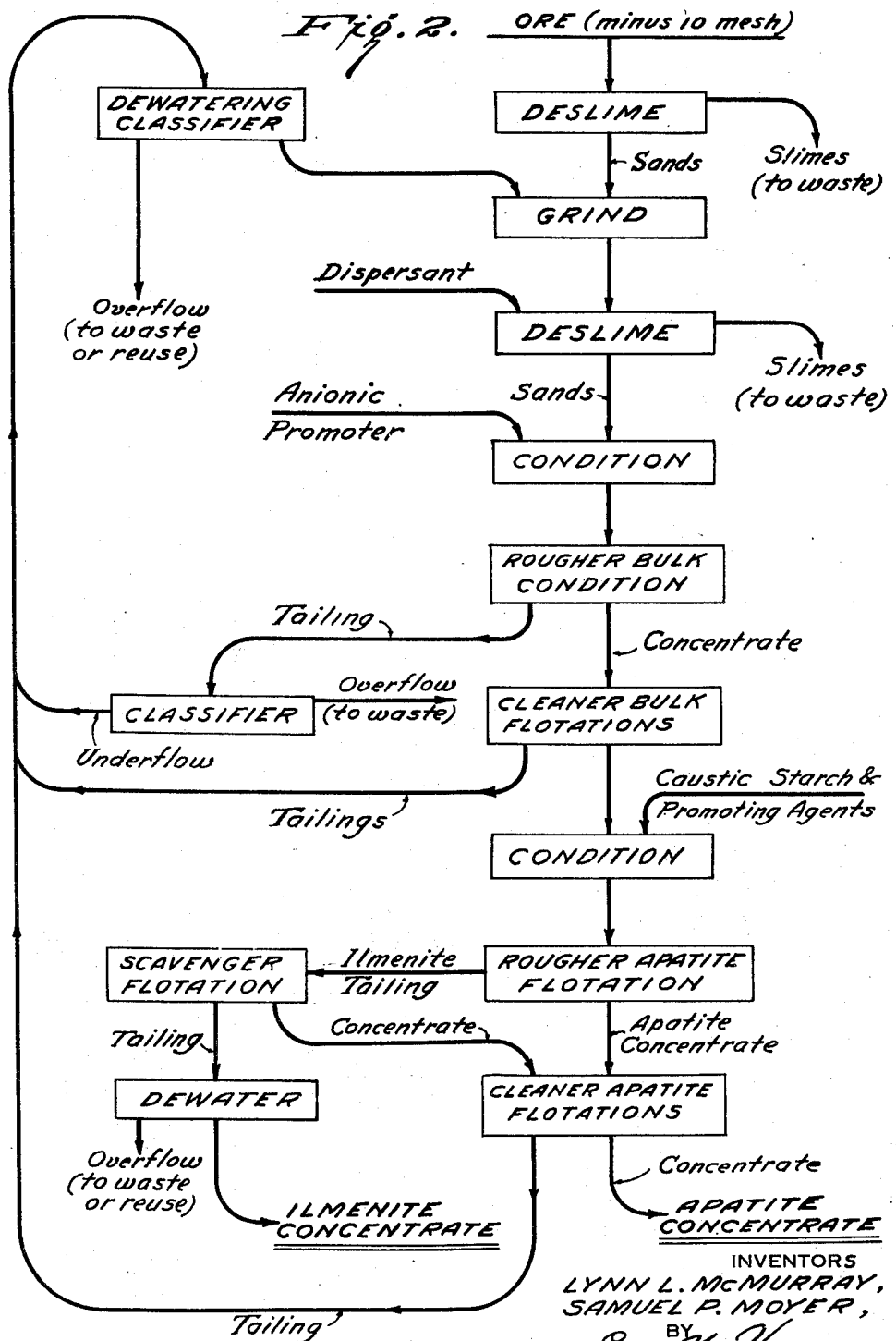

2,525,146

UNITED STATES PATENT OFFICE 2,525,146

SELECTIVE SEPARATION BY FLOTATION OF PHOSPHATIC TITANIUM-OXIDE MIXTURES

Lynn L. McMurray, Asheville, N. C., and Samuel P. Moyer, Greenwich, Conn., assignors to American Cyanamid Company, New York, N. Y., a corporation of Maine Application December 20, 1945, Serial No. 636,228

11 Claims. (Cl. 209—167)

This invention relates to the beneficiation by froth flotation of those metallic oxide ores containing excessive amounts of phosphate minerals. More particularly, it is concerned with the separation of phosphorous-bearing minerals such as apatite from metallic oxide minerals such as ilmenite, rutile, magnetite, hematite and the like.

The typical problems involved as well as their solutions are found in the production of ilmenite concentrates. In commercial practice, the use of titanium oxides has become increasingly important and accordingly the demand for high grade ore from which they may be recovered has steadily increased. Unfortunately, while there are many natural deposits of titanium minerals, the grade of these ores in many cases is not sufficiently high to make recovery of titanium oxides therefrom commercially feasible. Particularly is this true of most deposits within the United States. Therefore, while the process is not limited thereto, the invention will be illustrated by its application to titanium-bearing ores and ilmenite in particular.

Natural deposits of titanium-bearing minerals are usually ores containing, in addition to the titanium-bearing minerals such is ilmenite, rutile or the like, a silica-bearing gangue. Ordinarily, this silica and/or silicate content must be reduced to produce a concentrate meeting commercial standards, for example, to be used as raw material for the production of titanium oxide pigments.

Moreover, a problem with which the present invention is particularly concerned is presented by the fact that in addition to the silica or silicates, many ores, particularly in the United States, contain a certain amount of phosphorous-bearing minerals. In the illustrative case of ilmenite, the phosphorous-bearing mineral is frequently apatite. The presence of phosphorous is objectionable in a raw material for the production of titanium oxide pigments in their various crystal forms such as rutile or anatase. Particularly is this true in the latter case. A commercially acceptable concentrate must have a low $P_2O_5$ content, usually the specification requiring 0.1% or less. Since the $P_2O_5$ assay may vary from about 1-2% in ilmenite concentrates obtained from ores which are worked primarily for other constituents to 12% or more, as found in ilmenite ores such as Nelsonite, the reduction of the $P_2O_5$ content is essential. Those processes which in the past have been employed to reduce the silica or silicate content are not effective for this purpose.

Despite the demand therefor, there has not hitherto been available a process for readily and effectively-producing concentrates of metallic oxides such as ilmenite or the like, sufficiently low in $P_2O_5$ content. Neither have the concentrates previously-obtainable always been in a satisfactory physical condition in which they can be readily dewatered and dried for further processing.

It is, therefore, a principal object of the present invention to provide a process by which can be obtained a titanium-oxide-bearing minerals concentrate satisfactorily low in $P_2O_5$ and capable of being readily dewatered.

In accordance with the present invention, reduction in the $P_2O_5$ content of an ore of a metallic oxide such as ilmenite is made by conditioning an apatite-ilmenite mixture, for example, with a novel group of reagents whereby the operator is readily able to depress the ilmenite during the succeeding flotation, using an anionic promoter for selectively floating the apatite. In the following description ilmenite is used as being typical of metallic oxide minerals to which the process of the present invention is applicable. However, the process is not limited to the treatment of ilmenite only. It is also useful in the treatment of other titanium-bearing minerals such as rutile or brookite and other metallic oxides such as magnetite, hematite and the like.

The invention will be illustrated in conjunction with the accompanying drawings in which:

Figure 1 is a flow sheet showing a typical ilmenite-apatite separation in accordance with the present invention; and Figure 2 is an amplification thereof in which the present invention is shown as applied to a typical process of treating a whole ore including siliceous gangue.

It is highly desirable that the apatite flotation be carried out with anionic-type reagents, if possible, since the latter not only are both simpler and more economical in use but produce a more readily dispersible concentrate. Unfortunately apatite and most metallic oxide minerals, including ilmenite, react very much the same to most anionic type promoters. It is necessary therefore that a depressant be found for one constituent or the other.

In accordance with the present invention it has been found that this depression is obtainable if the feed is suitably conditioned with starch and an alkali-metal hydroxide. Preferably during the same conditioning, an anionic-type promoter for the apatite is added. The ilmenite is substantially quantitatively depressed and a substantially quantitative recovery of the apatite is obtained by means of flotation.

Shown in Figure 1 is a process of apatite-ilmenite separation of general application to mixtures of ilmenite and apatite of various origin. The process is applicable whether the mixture to be beneficiated is a concentrate from an ore that is worked primarily for some constituent other than the ilmenite; or is a natural apatite-ilmenite mixture; or is an apatite-ilmenite concentrate obtained by gravity separation; or is a bulk concentrate obtained by froth flotation as shown in the discussion of the process of Figure 2.

As shown in Figure 1, the steps in the present process depend somewhat on the nature of the mixture to be separated. If, as will be true in most cases, the feed is a previously-obtained concentrate, it may be fed directly to the conditioning operation. On the other hand, if the mixture is not in suitable physical condition for direct use as flotation feed, it should be ground to a suitable size, preferably about minus 50 to minus 65 mesh and freed of slimes if any are present. Grinding in the presence of a suitable dispersant such as an alkali, or a soluble alkali metal silicate usually will be found of considerable assistance in carrying out an effective desliming.

In any case, the prepared feed is sent to a conditioning operation, preferably in a pulp of high solids, in which it is treated with starch and alkali. The alkali-starch mixture, which is commonly referred to as caustic starch or causticized starch is actually a mixture of starch and a large excess of alkali. Preferably it is fed as a solution containing about 5–10% of dissolved solids. The alkali-starch ratio may vary from about 5–1 to 30–1. It has been found that about 20–25 parts of caustic per part of starch is an effective mixture. The amount used must be sufficient to provide a high pH as well as to add a sufficient quantity of starch. In usual practice about 3–5 pounds of a 20–1 ratio, per ton of flotation feed has been found effective both in effectively depressing the ilmenite and producing a pH above 9.0. In some cases, particularly where water is reused, this may be reduced to about half that amount, and in some few cases considerably more may be found helpful.

A high pH is necessary, the exact value above the 9.0 obtained when using about three pounds of the 20–1 ratio caustic-starch mixture per ton of flotation feed depending on the ore being treated and the pulp density. After adding the starch-caustic reagent, conditioning should be carried out for sufficient time to insure a very thorough dissemination. This may require as long as 10–20 minutes in some cases to insure effective treatment.

In addition to the depressant, there is also the question of the promoter or collector for the apatite constituent. It has been found that this may be substantially any good anionic promoter of the fatty-acid or soap type. Good results are obtained with fatty acids such as oleic acid, fish-oil fatty acids, cocoanut-oil fatty acids and the like; with resin or naphthenic acids, talloel and the like. These may be used per se or as sodium, potassium or ammonium soaps thereof.

Talloel has been found to give excellent results and since it is readily-available and relatively-inexpensive is perhaps preferable. In general the amount required is relatively small, from 0.25 to about 1.0 lbs./ton of talloel per ton of flotation feed, or equivalent amounts of other reagents, being adequate for the majority of operations. In some few cases more may be required. Excessive amounts over that necessary to concentrate the apatite should be avoided as tending to overcome the effect of the ilmenite depressant.

Preferably the promoter is added during the conditioning operation. It makes little difference, however, whether it is added as the free fatty acid or in pre-saponified form. There is sufficient alkali present during conditioning to assure that if added as the free fatty acid, the promoter is quickly saponified in situ.

After completing the conditioning operation, the pulp is diluted to flotation density, if treated at high solids and subjected to flotation to float the apatite concentrate. One feature should be noted. For example, if flotation is carried out on a pulp conditioned at high solids, after different degrees of dilution, changes in the nature of the froth characteristics and the resultant concentrates floated thereby are to be noticed. Too high a solids content does not permit effective operation of the cell. As the solids content is decreased, a range is found in which the froth, while visually appearing dry is well flocculated and carries the concentrate in excellent condition. On still further dilution the froth becomes thin and watery and the concentration becomes poor or ineffective. The distinction in the froth quality is readily apparent to the eye but is difficult to assign numerical values. Care should be taken to conduct the flotation at such dilution that for the amount of alkali-starch used the froth quality is such as to produce the optimum flotation of apatite.

The diluted conditioned pulp is then sent to the rougher flotation circuit as is shown in Figure 1. An excellent separation of the apatite from the ilmenite is obtained. The tailing in most cases is in suitable condition to be used as a raw material in the production of titanium oxide pigments without further beneficiation.

Since apatite itself is a commercially saleable product, the rougher concentrate is given a cleaner flotation and preferably, as shown in Figure 1, a recleaner flotation resulting in a clean, well-flocculated apatite concentrate suitable for dewatering. The tailing from the cleaner flotation, or the recleaner flotation if one is used, may in most cases be readily discarded without excessive loss. If so desired either or both may be recycled to a grinding operation.

In sustained operation on a commercial scale irregularities in operating conditions frequently occur. For this reason, as shown in Figure 1, the ilmenite tailing from the apatite rougher flotation is advantageously sent to a scavenger flotation. This is purely a precautionary measure in most instances. In normal operation very little, if any, concentrate is obtained. However, if through some variation in the process apatite might otherwise be found in the ilmenite tailing, it will be cleaned up in this way without getting into the product. The scavenger concentrate, if any, may be sent to the cleaner flotation as shown in Figure 1 or to the recleaner flotation as may be desired. The tailing from the scavenger flotation comprises the ilmenite product. It is in an excellently flocculated condition and as shown in the drawing is deslimed and/or dewatered to constitute the final ilmenite concentrate.

The process as delineated in Figure 1 may be illustrated in conjunction with the following example which is illustrative only and not by way of limitation. All parts are by weight unless otherwise noted.

EXAMPLE 1

An apatite-ilmenite concentrate obtained in previous treatment of a whole ore for other purposes, was pulped with water to about 55% solids, placed in a Fagergren flotation cell with the air inlet closed and conditioned for about 5 minutes with 3.75 lbs. of starch caustic (22 parts caustic to 1 part starch) and 0.58 lb./ton of talloel per ton of flotation feed, the conditioning being carried out with a propeller type agitator. The conditioned pulp was diluted to about 15% solids (pH 10.5-10.6) and floated for 10 minutes. The apatite concentrate therefrom was collected and given a single cleaner flotation. The results are shown in the following table.

Table I

| Product | Percent Wt. | Analysis, Percent | | Recovery, Percent | |
|---|---|---|---|---|---|
| | | $P_2O_5$ | $TiO_2$ | $P_2O_5$ | $TiO_2$ |
| Apatite Concentrate | 25.1 | 42.0 | 0.6 | 98.8 | 0.4 |
| Apatite Middling | 1.8 | 3.0 | 40.3 | 0.5 | 2.1 |
| Ilmenite Concentrate | 73.1 | 0.11 | 45.3 | 0.9 | 97.5 |
| Feed (Calc.) | 100.0 | 10.7 | 34.0 | 100.0 | 100.0 |

In Figure 2 is shown a flow sheet of a typical operation in which the apatite-ilmenite separation process of the present invention is incorporated in the overall beneficiation of a high apatite content Nelsonite ore containing ilmenite, rutile, magnetite, hematite, apatite and silica and silicate gangue minerals. By way of preparation, the ore, which has been given a preliminary crushing to about ⅜ inch, is deslimed, either hydraulically or by wet screening. This will often permit discarding much of the original weight with only a small loss in potential titanium recovery, and greatly facilitates further operations.

The ore is then ground, preferably using about 0.5-1.0 lb./ton of feed of some dispersant such as alkali or a soluble alkali silicate. Grinding to about minus 50 and preferably minus 65 mesh is usually found good practice. Somewhat coarser or finer sizes, however, may be employed. The ore pulp is again deslimed to eliminate the secondary slimes. It is not essential to carry desliming to the degree required for example for efficient flotation with a cationic-type promoter. Simple desliming, as by hydraulic classification or by screening at about 325 mesh is satisfactory. While this method is preferred, any desired ore preparation may be employed which reduces the ore size satisfactorily and eliminates the bulk of the slimes.

Subsequent to desliming, the sands are conditioned for the first flotation step in which a bulk apatite-ilmenite concentrate is floated from the silica-bearing gangue. An anionic promoter of any one of several types may be used in floating this concentrate. For example, it may be a fatty acid such as oleic acid, fish oil fatty acids, cocoanut oil fatty acids and the like; resin or naphthenic acids; talloel. The circuit used should be neutral or slightly alkaline, however, and sulfonated reagents are not used to their best advantage.

Preferably the promoter will be a sodium, potassium or ammonium neutralized soap. A sodium or ammonium talloel soap is highly satisfactory in use and because of their availability and low cost they are perhaps preferable. The soap may be presaponified or the free fatty acid and a sufficient amount of alkali may be used and the soap formed in situ. The amounts required are not particularly high, being in the range of about 0.25-5.0 lb./ton of feed and an amount from 0.5-1.0 lb./ton usually being satisfactory for all except the extraordinary cases.

When the apparatus is available, a conditioning step is highly advantageous, although if necessary the reagent may be added directly to the flotation cell. In the latter case, stage-addition of the promoter in two or three parts is preferable to a single addition of the entire amount. Where it is practical to do so, the pulp is preferably conditioned at a high solids content of some 50-70%. Conditioning should be carried out for a sufficient length of time to thoroughly "oil" the pulp. Usually about five minutes has been found to be adequate. This conditioning operation has been found very helpful in obtaining the bulk concentrate in a form which is best suited for the subsequent steps.

The bulk concentrate flotation is usually carried out advantageously at about 20% solids, flotation being carried out until a good recovery is obtained. The tailings from this flotation may be discarded. They will, however, usually contain some useful ilmenite, particularly in the heavier sands. It is therefore preferred, as shown in the drawing, to pass the tailings to a hydraulic classifier. Only the classifier overflow is discarded or sent to a settling pond for reuse of the water. The classifier underflow is dewatered, the overflow from the dewatering operation also being discarded or sent to the settling pond, and the dewatered sands recycled to the grinding step.

The bulk concentrate is given one or more cleaner flotations, as shown in Figure 2, the tailings from which are sent to the dewatering classifier along with the underflow from the hydraulic classifier. The clean bulk concentrate is ordinarily free from excessive amounts of objectionable siliceous gangue, the $SiO_2$ content being readily reduced by this treatment to a value such that in the final ilmenite concentrate the $SiO_2$ assay is about 1.0% or less.

Because the subsequent flotation of apatite from the ilmenite is preferably conducted after conditioning at high solids, this makes it preferable to control the cleaner and/or recleaner flotation to obtain a solids content of the clean, bulk concentrate of about 50% or higher. If this is done, there is no necessity to dewater the concentrate before using it as feed in the succeeding apatite-ilmenite separation. This solids content is not difficult to obtain in the practice of the process. Control may be simply by visual observation or by automatic controls.

When obtained by the process outlined, the bulk concentrate is in a suitable condition to be fed to the apatite-ilmenite separation. By a comparison of Figures 1 and 2 it will be seen that these are the same operations previously discussed. There is one exception. In operating an overall procedure of this type the tailings from the apatite cleaner flotations will contain considerable quantities of material which constitute potential titanium recovery. While these may be discarded if so desired, they are usually passed, with the various tailings obtained during the bulk concentrate flotation, to the dewatering classifier.

This overall process may be found illustrated by the following example which again is intended to be illustrative only and not by way of limitation.

EXAMPLE 2

Whole ore containing ilmenite, rutile, magnetite, hematite, apatite and siliceous gangue was crushed to minus ⅜ inch and given a primary desliming. The sands therefrom were ground with about 1.5 lbs./ton of ball mill feed of sodium silicate for a sufficient time to pass 65 mesh and again deslimed. The deslimed sands were conditioned at 65–70% solids for about 5 minutes with 1.5–2.0 lbs./ton of talloel sodium soap, diluted to about 20% solids and floated to obtain the rougher concentrate. The concentrate was cleaned, the cleaner concentrate being taken at about 55% solids and passed to a second conditioning operation in which 3.5–4.0 lbs. of starch caustic (as a 7.5% dissolved solids solution containing about 20 parts of caustic per part of starch) and 0.7–1.0 pounds of talloel per ton of original flotation feed were incorporated therewith. These conditioned sands were diluted to flotation densities of about 10–15% and a pH of about 10.5–10.6. A rougher apatite concentrate was taken and subjected to cleaner and recleaner flotations to produce a final apatite concentrate. The machine discharge or tailing from the rougher apatite flotation was passed through a scavenger flotation and the tailings therefrom deslimed and dewatered to obtain the final ilmenite concentrate. The process was run under these conditions for a number of days, the reagent conditions varying slightly as shown by the above indicated ranges. From time to time samples were taken and assayed. Typical results are shown in the following Table II.

*Table II*

| Sample | Product | Per Cent Weight | Analysis, Per Cent | | Recovery, Per Cent | |
|---|---|---|---|---|---|---|
| | | | $P_2O_5$ | $TiO_2$ | $P_2O_5$ | $TiO_2$ |
| A | Apatite Conc. | 6.5 | 40.1 | 1.3 | 49.7 | 0.3 |
| | Ilmenite Conc.[1] | 41.7 | 0.08 | 45.6 | 0.6 | 66.1 |
| | Tailings | 25.3 | 5.9 | 25.8 | 28.5 | 22.7 |
| | Sec. Slime | 26.5 | 4.2 | 11.8 | 21.2 | 10.9 |
| | Mill Feed (Calc.) | 100.0 | 5.2 | 23.8 | 100.0 | 100.0 |
| B | Apatite Conc. | 8.5 | 39.2 | 3.1 | 75.5 | 1.1 |
| | Ilmenite Conc.[2] | 41.7 | 0.07 | 45.5 | 0.7 | 77.2 |
| | Tailings | 20.8 | 1.7 | 11.1 | 8.0 | 9.4 |
| | Sec. Slime | 29.0 | 2.4 | 10.4 | 15.8 | 12.3 |
| | Mill Feed (Calc.) | 100.0 | 4.4 | 24.6 | 100.0 | 100.0 |
| C | Apatite Conc. | 4.9 | 40.3 | 1.3 | 54.6 | 0.3 |
| | Ilmenite Conc.[3] | 37.3 | 0.07 | 45.0 | 0.7 | 70.4 |
| | Tailings | 27.0 | 2.7 | 16.4 | 20.1 | 18.5 |
| | Sec. Slime | 30.8 | 2.9 | 8.4 | 24.6 | 10.8 |
| | Mill Feed (Calc.) | 100.0 | 3.6 | 23.9 | 100.0 | 100.0 |
| D | Apatite Conc. | 5.4 | 40.2 | 1.0 | 68.0 | 0.2 |
| | Ilmenite Conc.[4] | 50.0 | 0.07 | 44.5 | 1.0 | 85.9 |
| | Tailings | 15.8 | 1.7 | 7.2 | 8.4 | 4.4 |
| | Sec. Slime | 28.8 | 2.5 | 8.5 | 22.6 | 9.5 |
| | Mill Feed (Calc.) | 100.0 | 3.2 | 25.9 | 100.0 | 100.0 |

[1] $SiO_2$—0.98. [2] $SiO_2$—0.94. [3] $SiO_2$—0.80. [4] $SiO_2$—1.02.

From these results it will be seen that not only is the process of the present invention adapted to produce satisfactory concentrates of both the phosphorous-bearing and the metallic-oxide minerals with high recovery, but it is well adapted for continuous operation.

We claim:

1. A method of beneficiating ores of titanium-bearing oxide minerals containing excessive amounts of phosphorous-bearing minerals and silica-bearing gangue which comprises the steps of reducing the ore to suitable size for flotation feed, making a substantially slime-free aqueous pulp thereof, conditioning the pulp with an effective amount of an anionic-type promoter, selected from the group consisting of the higher aliphatic fatty acids, resin acids, naphthenic acids, talloel, mixtures thereof, their sodium, potassium, and ammonium salts and mixtures of these materials, to float substantially all the titanium and phosphorous minerals therefrom, subjecting the conditioned pulp to froth flotation; collecting the resultant flotation bulk concentrate; conditioning an aqueous pulp of the bulk concentrate with an effective amount of caustic starch and of an alkali metal hydroxide to produce a pH above 9.0 at flotation density, and with an anionic promoter for the phosphorous-bearing minerals, selected from the same group from which the bulk flotation promoter was selected; and subjecting the conditioned pulp to froth flotation; collecting the resultant flotation concentrate as a phosphorous-bearing concentrate substantially free from titanium-bearing oxide minerals and the residual tailing as a titanium-bearing oxide mineral tailing substantially free from phosphorous-bearing minerals and low in silica-bearing gangue.

2. A method of beneficiating ores of titanium-bearing oxide minerals containing excessive amounts of apatite and silica-bearing gangue, which comprises the steps of reducing the ore to suitable size for flotation feed, making a substantially slime-free aqueous pulp thereof, conditioning the pulp with an effective amount of an anionic-type promoter, selected from the group consisting of the higher aliphatic fatty acids, resin acids, naphthenic acids, talloel, mixtures thereof, their sodium, potassium, and ammonium salts and mixtures of these materials, to a float substantially all the titanium and apatite minerals therefrom, subjecting the conditioned pulp to froth flotation; collecting the resultant flotation bulk concentrate; conditioning an aqueous pulp of the bulk concentrate with an effective amount of caustic starch and of an alkali metal hydroxide to produce a pH above 9.0 at flotation density, and with an anionic promoter for the apatite, selected from the same group from which the bulk flotation promoter was selected; and subjecting the conditioned pulp to froth flotation; collecting the resultant flotation concentrate as an apatite concentrate substantially free from titanium-bearing oxide minerals and the residual tailing as a titanium-bearing oxide mineral tailing substantially free from apatite and low in silica-bearing gangue.

3. A method of beneficiating ores of ilmenite containing excessive amounts of phosphorous-bearing minerals and silicia-bearing gangue which comprises the steps of reducing the ore to suitable size for flotation feed, making a substantially slime-free aqueous pulp thereof, conditioning the pulp with an effective amount of an anionic-type promoter, selected from the group consisting of the higher aliphatic fatty acids, resin acids, naphthenic acids, talloel, mixtures thereof, their sodium, potassium, and ammonium salts and mixtures of these materials, to float substantially all the ilmenite and phosphorous minerals therefrom, subjecting the conditioned pulp to froth flotation; collecting the resultant flotation bulk concentrate; conditioning an aqueous pulp of the bulk concentrate with an effective amount of caustic starch and of an alkali metal hydroxide to produce a pH above 9.0 at flotation density, and with an anionic promoter for the phosphorous-bearing minerals, selected from the same group from which the bulk flotation promoter was selected; and subjecting the conditioned pulp to froth flotation; collecting the resultant flotation concentrate as a phosphorous-bearing concentrate substantially free from ilmenite and the residual tailing as an ilmenite concentrate substantially free from phosphorous-bearing minerals and low in silicia-bearing gangue.

4. A method of beneficiating ores of ilmenite containing excessive amounts of apatite and silica-bearing gangue which comprises the steps of reducing the ore to suitable size for flotation feed, making a substantially slime-free aqueous pulp thereof, conditioning the pulp with an effective amount of an anionic-type promoter, selected from the group consisting of the higher aliphatic fatty acids, resin acids, naphthenic acids, talloel, mixtures thereof, their sodium, potassium, and ammonium salts and mixtures of these materials, to float substantially all the ilmenite and apatite therefrom, subjecting the conditioned pulp to froth flotation; collecting the resultant flotation bulk concentrate; conditioning an aqueous pulp of the bulk concentrate with an effective amount of caustic starch and of an alkali metal hydroxide to produce a pH above 9.0 at flotation density, and with an anionic promoter for the apatite, selected from the same group from which the bulk flotation promoter was selected; and subjecting the conditioned pulp to froth flotation; collecting the resultant flotation concentrate as an apatite concentrate substantially free from ilmenite and residual tailing as an ilmenite concentrate substantially free from apatite and low in silica-bearing gangue.

5. A process of separating titanium-bearing oxide minerals from phosphorous-bearing minerals which comprises the steps of preparing an aqueous pulp of the mixture, in particle sizes suitable for flotation feed and substantially free from slimes; conditioning the pulp with an effective amount of caustic starch, of an alkali-metal hydroxide and of an anionic-type promoter, selected from the group consisting of the higher aliphatic fatty acids, resin acids, naphthenic acids, talloel, mixtures thereof, their sodium, potassium, and ammonium salts and mixtures of these materials, for the phosphorous-bearing minerals, there being enough alkali to produce a pH above 9.0 at flotation density; and subjecting the pulp to froth flotation; collecting the resultant flotation concentrate of substantially all the phosphorous-bearing minerals substantially free from titanium-bearing oxide minerals and the residual tailing as a titanium-bearing oxide minerals concentrate substantially free from phosphorous-bearing minerals.

6. A process according to claim 5 in which the feed is a flotation concentrate of titanium-bearing oxide minerals and phosphorous-bearing minerals substantially free from silica, obtained by flotation from silica-bearing gangue with an anionic-type promoter.

7. A process according to claim 5 in which the alkali-starch ratio is from about 5–1 to 30–1.

8. A process according to claim 5 in which the alkali-starch ratio is from about 18–1 to 25–1.

9. A process of separating titanium-bearing oxide minerals from apatite which comprises the steps of preparing an aqueous pulp of the mixture, in particle sizes suitable for flotation feed and substantially free from slimes; conditioning the pulp with an effective amount of caustic starch, of an alkali-metal hydroxide and of an anionic-type promoter, selected from the group consisting of the higher aliphatic fatty acids, resin acids, naphthenic acids, talloel, mixtures thereof, their sodium, potassium, and ammonium salts and mixtures of these materials, for the apatite, there being enough alkali to produce a pH above 9.0 at flotation density; and subjecting the pulp to froth flotation; collecting the resultant flotation concentrate of substantially all the apatite substantially free from titanium-bearing oxide minerals and the residual tailing as a titanium-bearing oxide minerals concentrate substantially free from apatite.

10. A process of separating ilmenite from phosphorous-bearing minerals which comprises the steps of preparing an aqueous pulp of the mixture, in particle sizes suitable for flotation feed and substantially free from slimes; conditioning the pulp with an effective amount of caustic starch, of an alkali-metal hydroxide and of an anionic-type promoter, selected from the group consisting of the higher aliphatic fatty acids, resin acids, naphthenic acids, talloel, mixtures thereof, their sodium, potassium, and ammonium salts and mixtures of these materials, for the phosphorous-bearing minerals, there being enough alkali to produce a pH above 9.0 at flotation density; and subjecting the pulp to froth flotation; collecting the resultant flotation concentrate of substantially all the phosphorous-bearing minerals substantially free from ilmenite and the residual tailing as an ilmenite concentrate substantially free from phosphorous-bearing minerals.

11. A process of separating ilmenite from apatite which comprises the steps of preparing an aqueous pulp of the mixture, in particle sizes suitable for flotation feed and substantially free from slimes; conditioning the pulp with an effective amount of caustic starch, of an alkali-metal hydroxide and of an anionic-type promoter, selected from the group consisting of the higher aliphatic fatty acids, resin acids, naphthenic acids, talloel, mixtures thereof, their sodium, potassium, and ammonium salts and mixtures of these materials, for the apatite, there being enough alkali to produce a pH above 9.0 at flotation density; and subjecting the pulp to froth flotation, whereby a concentrate of substantially all the apatite substantially free from ilmenite and the residual tailing as an ilmenite concentrate substantially free from apatite.

LYNN L. McMURRAY.
SAMUEL P. MOYER.

REFERENCES CITED

The following references are of record in the file of this patent:

UNITED STATES PATENTS

| Number | Name | Date |
|---|---|---|
| 1,914,694 | Lange | June 30, 1933 |
| 2,040,187 | Rose | May 12, 1936 |
| 2,363,104 | Weinig | Nov. 21, 1944 |
| 2,364,777 | Brown | Dec. 12, 1944 |

OTHER REFERENCES

Bureau of Mines Report of Investigation, R I 3425 (1938), pages 89 to 91, R I 3328, pages 125 to 130.